(12) United States Patent
Lee

(10) Patent No.: US 7,956,845 B2
(45) Date of Patent: Jun. 7, 2011

(54) APPARATUS AND METHOD FOR PROVIDING VIRTUAL GRAFFITI AND RECORDING MEDIUM FOR THE SAME

(75) Inventor: Seung-Yi Lee, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 936 days.

(21) Appl. No.: 10/864,926

(22) Filed: Jun. 10, 2004

(65) Prior Publication Data
US 2005/0099400 A1    May 12, 2005

(30) Foreign Application Priority Data

Nov. 6, 2003  (KR) .................. 10-2003-0078483

(51) Int. Cl.
*G06F 3/041* (2006.01)
(52) U.S. Cl. .................. 345/173; 345/179; 715/825
(58) Field of Classification Search .................. 345/169, 345/173–179; 715/625–629, 790, 825–829; 178/18.01–18.04
See application file for complete search history.

(56) References Cited

U.S. PATENT DOCUMENTS

| 6,130,665 | A | 10/2000 | Ericsson | |
|---|---|---|---|---|
| 6,492,978 | B1 * | 12/2002 | Selig et al. | 345/173 |
| 6,727,917 | B1 * | 4/2004 | Chew et al. | 715/765 |
| 6,791,467 | B1 * | 9/2004 | Ben-Ze'ev | 340/825.69 |
| 6,791,529 | B2 * | 9/2004 | Shteyn | 345/156 |
| 6,956,562 | B1 * | 10/2005 | O'Hara et al. | 345/173 |
| 7,168,048 | B1 * | 1/2007 | Goossen et al. | 715/797 |
| 2001/0024212 | A1 * | 9/2001 | Ohnishi | 345/769 |
| 2002/0054027 | A1 * | 5/2002 | Porter et al. | 345/173 |
| 2003/0081016 | A1 * | 5/2003 | Rahimzadeh et al. | 345/864 |
| 2003/0206199 | A1 * | 11/2003 | Pusa et al. | 345/794 |
| 2004/0263486 | A1 * | 12/2004 | Seni | 345/173 |
| 2005/0091609 | A1 * | 4/2005 | Matthews et al. | 715/804 |

FOREIGN PATENT DOCUMENTS

| JP | 04-162090 | 6/1992 |
|---|---|---|
| JP | 11-249782 | 9/1999 |
| JP | 2000-123114 | 4/2000 |
| KR | 2001-0096061 | 11/2001 |

* cited by examiner

*Primary Examiner* — Kimnhung Nguyen
(74) *Attorney, Agent, or Firm* — The Farrell Law Firm, P.C.

(57) ABSTRACT

An apparatus and method for providing a virtual graffiti function and a recording medium for the same. The apparatus for providing a virtual graffiti function includes: a touch-screen display for displaying information on its screen, and at the same time receiving user-entry data created by a user touching the screen; and a controller connected to the touch-screen display, which overlaps a graffiti screen image with a main screen image in a virtual graffiti area for providing a portion of the screen with virtual graffiti, classifies the user-entry data created by the user touching the screen into application execution entry data and graffiti entry data according to the touched position and/or method, and processes the classified user-entry data differently from each other. Therefore, the apparatus can effectively implement a graffiti function in a hand-held device limited in size, and can also provide an effective recording medium.

24 Claims, 10 Drawing Sheets

APPARATUS AND METHOD FOR PROVIDING VIRTUAL GRAFFITI AND RECORDING MEDIUM FOR THE SAME

PRIORITY

This application claims priority to an application entitled "APPARATUS AND METHOD FOR PROVIDING VIRTUAL GRAFFITI AND RECORDING MEDIUM FOR THE SAME", filed in the Korean Intellectual Property Office on Nov. 6, 2003 and assigned Ser. No. 2003-78483, the contents of which are hereby incorporated by reference.

BACKGROUND OF THE INVENTION

1. Field of the Invention

The present invention relates to a hand-held device (such as a mobile phone, PDA, or other mobile terminal), and more particularly to an apparatus for providing virtual graffiti using a touch-screen display for displaying information on its screen simultaneously with receiving user-entry data resulting from the user touching the screen.

2. Description of the Related Art

Conventional hand-held devices, such as for example, PDAs (Personal Digital Assistants) and smart phones where a PDA function is combined with a mobile terminal function, receive user-entry data from a touchpad. Particularly, a specific hand-held device (e.g., a smart phone) for receiving user-entry data from a keypad configured in the form of a 3×4 matrix keypad (i.e., ten number keys 0~9 and two function keys * and #) must enable a user to directly draw desired numeric or character information on its touchpad. The number of overall keys contained in the keypad is limited to a predetermined number, whereby it is difficult for the user of the smart phone to effectively enter all the characters using only the keys contained in the keypad. Such a hand-held device capable of receiving numeric or character data generally contains a predetermined data entry area. The data entry area is called a graffiti area in the case of Palm OS (operating System).

The first-generation PDA or smart phone has generally printed the graffiti area on a touchpad to implement a graffiti function as shown in FIGS. 1 and 2. FIG. 1 is an exemplary view illustrating a touch-screen display 100 equipped with a graffiti area 108 printed on a touchpad 102. FIG. 2 is an exemplary configuration where a touchpad 202 equipped with a graffiti area 208 is separated from a touch-screen display 200. Generally, the touch-screen display 100 of FIG. 1 and the touch-screen display 200 of FIG. 2 are constructed by covering an LCD (Liquid Crystal Display) panel for displaying images with a TSP (Touch-Sensitive Panel) for receiving user-entry data, respectively. Therefore, the touch-screen display 100 and the touch-screen display 200 can display information on their screens 104 and 204, and at the same time can receive user-entry as a result of the user touching the screens 104 and 204, respectively. Various application information is displayed on the screens 104 and 204 so that the user can view the displayed information. FIGS. 1 and 2 show display formats of icons 106 and 206 for executing a variety of applications. An icon 112 and a graffiti input box 110 are printed on the graffiti area 108 of FIG. 1. An icon 212 and a graffiti input box 210 are printed on the graffiti area 208 of FIG. 2. The icons 112 and 212 are adapted to implement a graffiti function. The graffiti input boxes 110 and 210 are adapted to receive graffiti entered by a user using a stylus pen.

There has recently been proposed a virtual graffiti scheme as shown in FIG. 3A for implementing the graffiti area using a software program, and the virtual graffiti scheme has become increasingly popular as a substitute for a current mobile phone. The virtual graffiti scheme enables a user to draw desired images (i.e., graffiti) on a screen of a touch-screen display so that the drawn graffiti is displayed on the screen. If the virtual graffiti is implemented using the software program, a flexible GUI (Graphic User Interface) service can be established, and at the same time the virtual graffiti area can disappear from the screen when the graffiti function is unused, as shown in FIG. 3B, resulting in increased efficiency of screen use. Referring to FIGS. 3A and 3B, a graffiti area 304 is displayed on a screen 302 of the touch-screen display 300. The screen 302 includes a plurality of icons 306 for executing a variety of applications in the same way as in the screens 104 and 204 of FIGS. 1 and 2. Similar to the graffiti areas 108 and 208 of FIGS. 1 and 2, the graffiti area 304 includes a plurality of icons 310 for executing the graffiti function and a graffiti input box 308 for enabling the user to enter desired graffiti using a data entry tool such as a stylus pen.

However, the graffiti implementation scheme for physically implementing the graffiti area as shown in FIGS. 1 and 2 and the virtual graffiti implementation scheme for software implementation of the graffiti area as shown in FIGS. 3A and 3B must assign additional dedicated areas or space to their graffiti areas. Hand-held devices must be a small-sized and lightweight communication terminal, such that the additional dedicated area for the graffiti area may encounter limitations due to the small-size and lightweight requirements. Particularly, in case of using a specific hand-held device having a screen where the size ratio of a width to a height is equal to 1:1 in a way similar to a folder-type smart phone, the specific hand-held device cannot use the graffiti function due to its use of a small-sized keyboard instead of the graffiti function.

SUMMARY OF THE INVENTION

Therefore, the present invention has been made in view of the above problems, and it is an object of the present invention to provide an apparatus and method for effectively implementing a graffiti function in a hand-held device limited in size, and a recording medium for the same.

It is another object of the present invention to provide an apparatus and method which need not assign an additional area or space to a virtual graffiti area, and a recording medium for the same.

It is yet another object of the present invention to provide an apparatus and method for providing a screen having a specific size ratio of 1:1 with a virtual graffiti function.

In accordance with the present invention, the above and other objects can be accomplished by the provision of an apparatus for providing virtual graffiti, comprising: a touch-screen display for displaying information on its screen, and at the same time receiving user-entry data created by a user touching the screen; and a controller connected to the touch-screen display, which overlaps a graffiti screen image with a main screen image in a virtual graffiti area for providing a portion of the screen with the virtual graffiti, the controller classifies the user-entry data created by the user touching the screen into application execution entry data and graffiti entry data according to the touched position and/or a manner in which the user touches the screen, and processes the classified user-entry data according to its classification.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
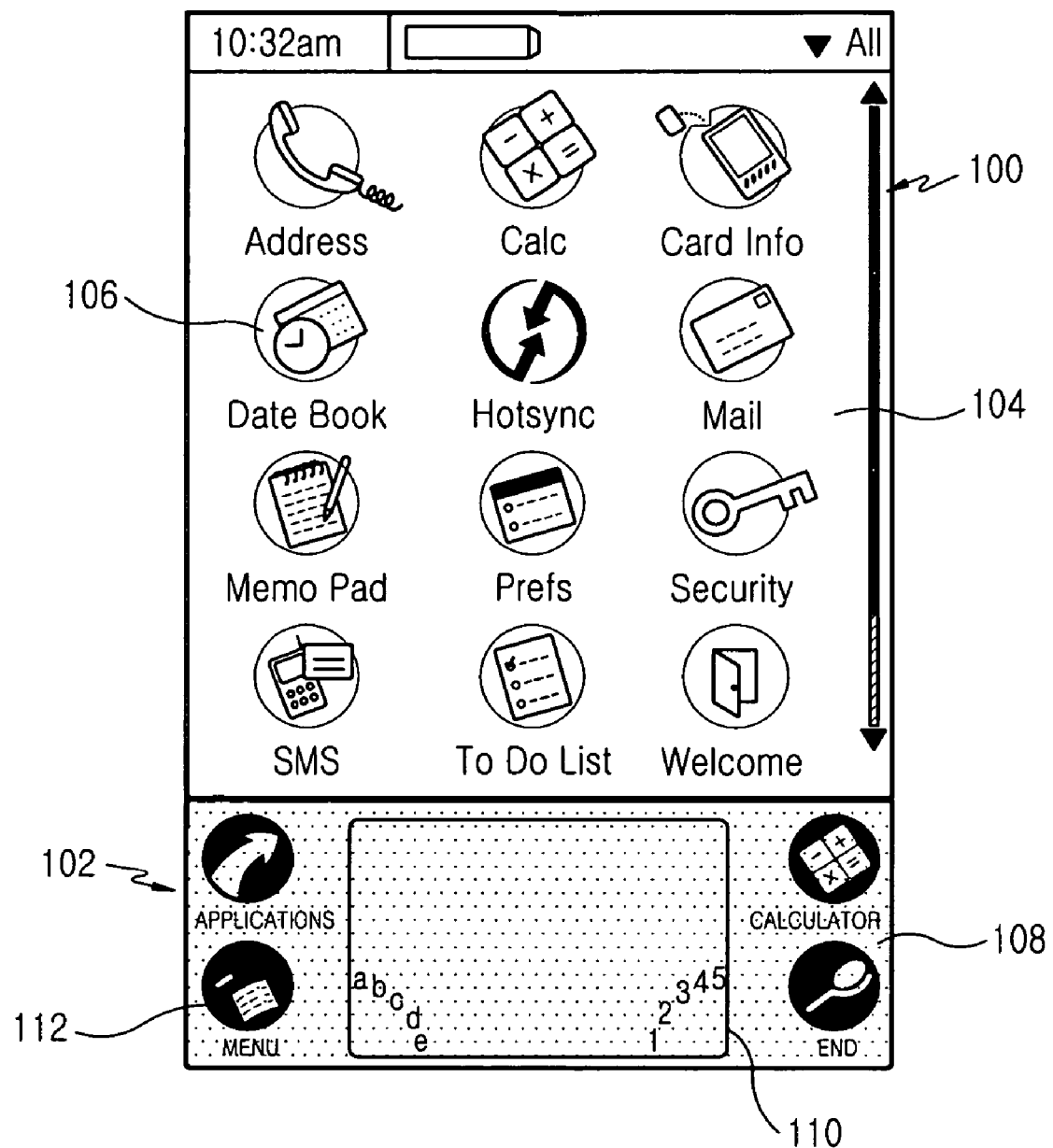
FIGS. 1 and 2 are exemplary views each illustrating a graffiti area printed on a touchpad.
Figure 2:
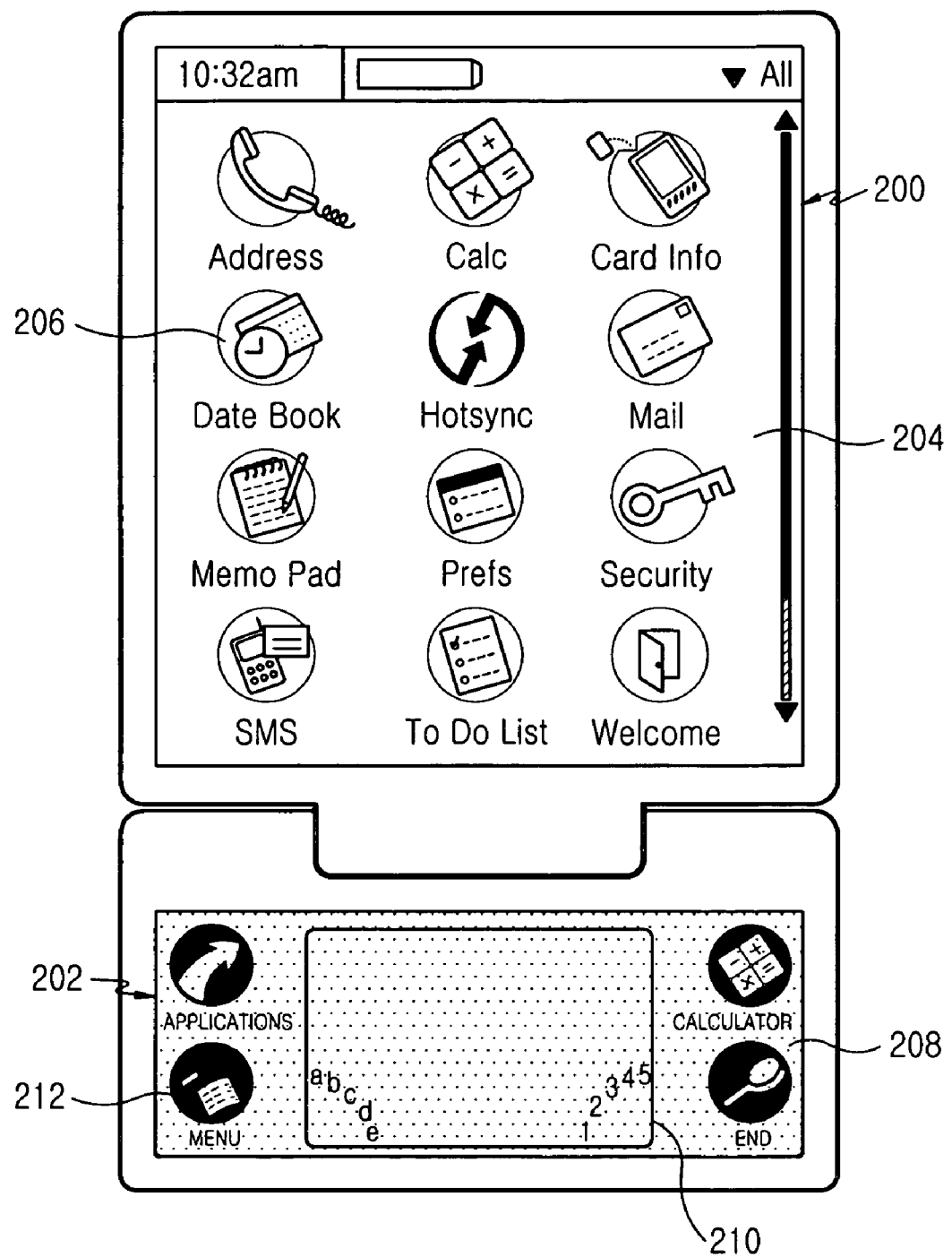

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention unclear.

Figure 3A:
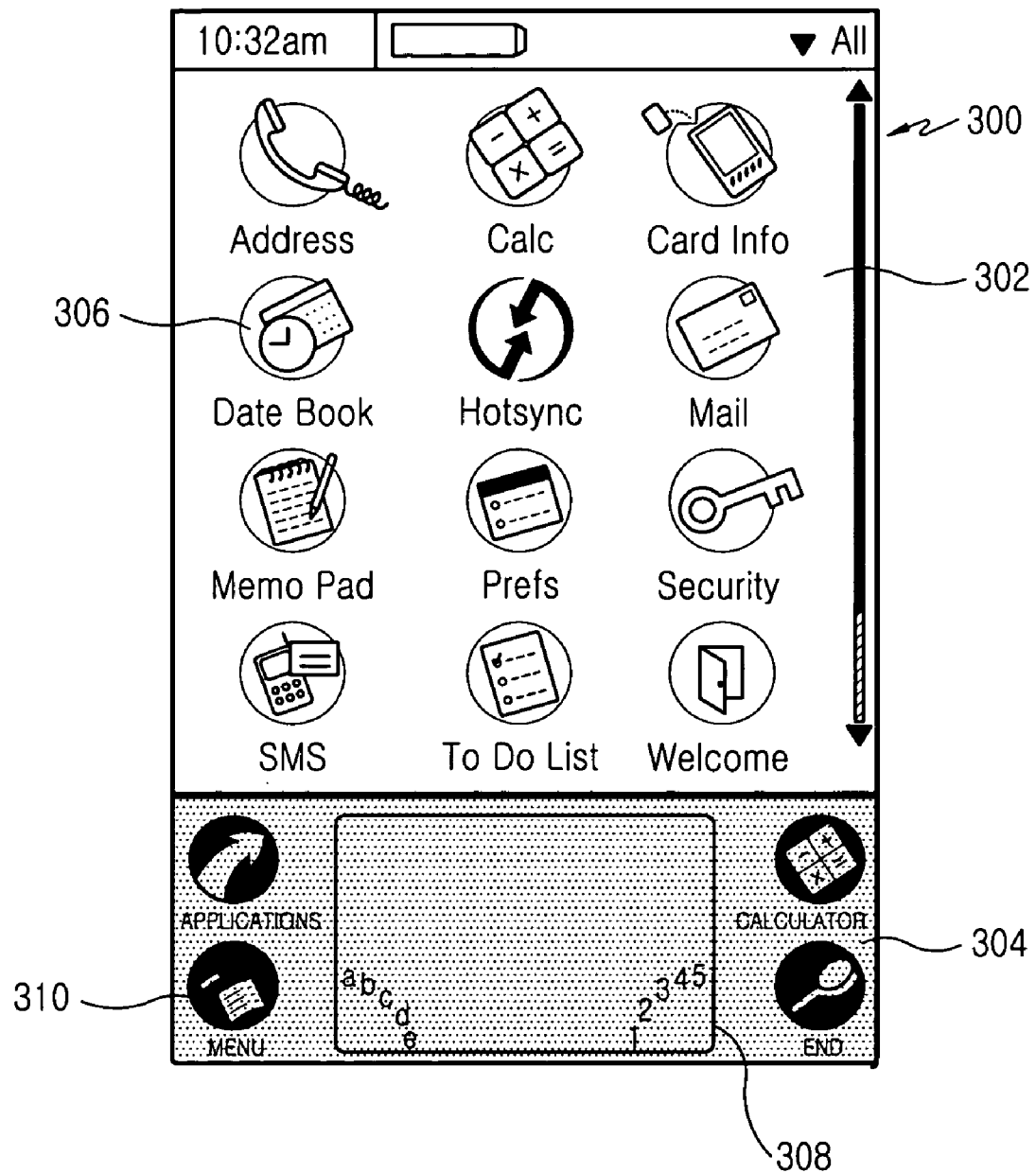
FIGS. 3A and 3B are exemplary views each illustrating a virtual graffiti area displayed on a screen contained in a touch-screen display in which the virtual graffiti area is implemented using software.
Figure 3B:
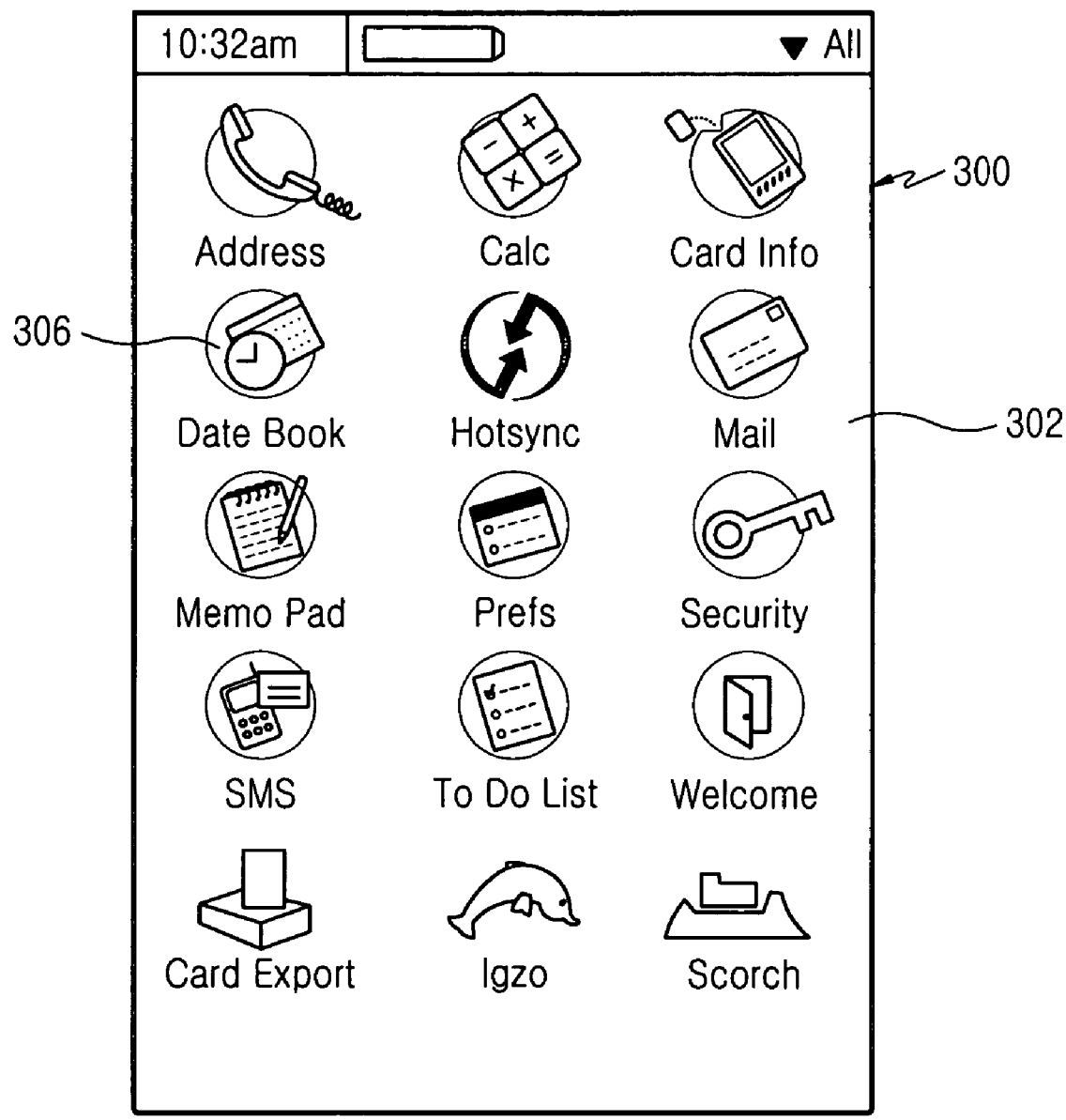
Figure 4A:
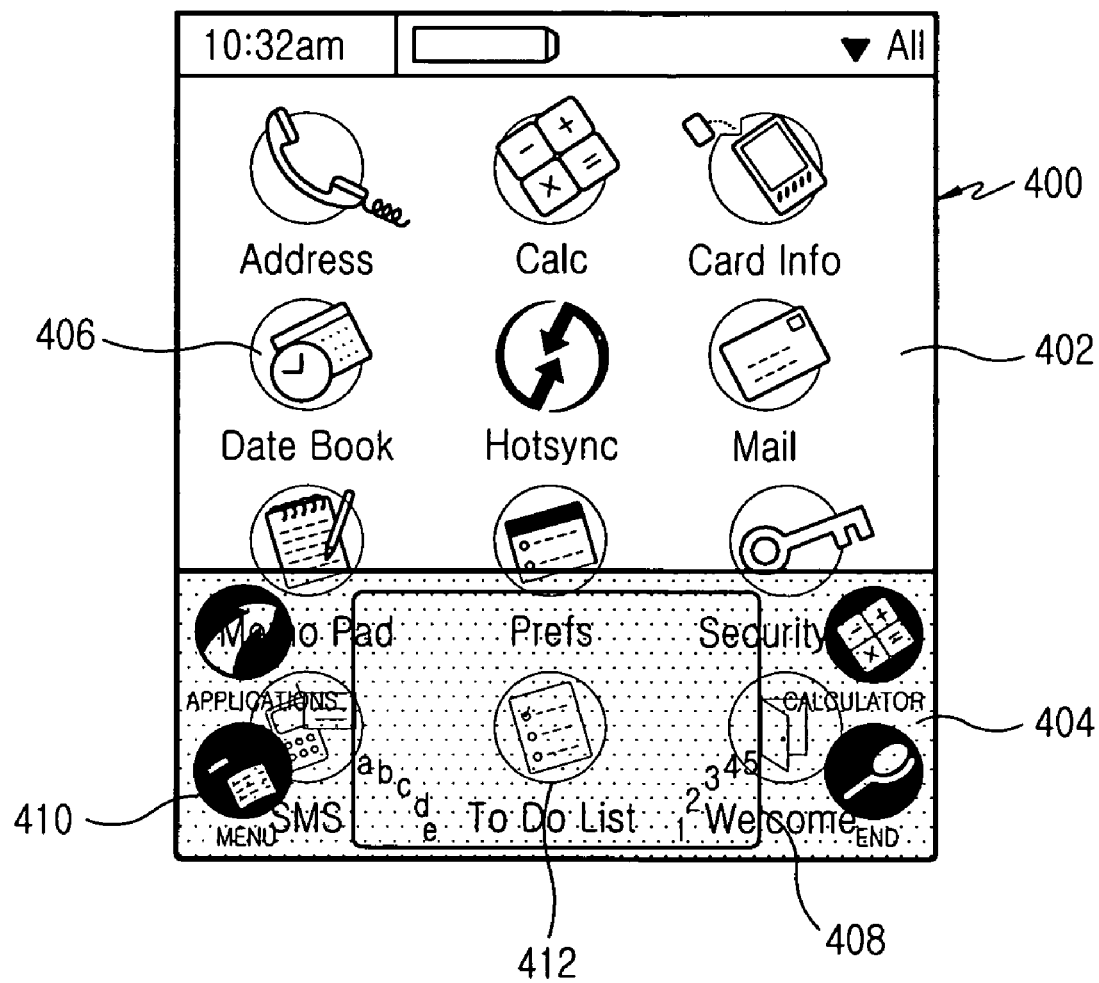
FIGS. 4A and 4B are exemplary views each illustrating a virtual graffiti area displayed on a screen contained in a touch-screen display in accordance with a preferred embodiment of the present invention.
Figure 4B:
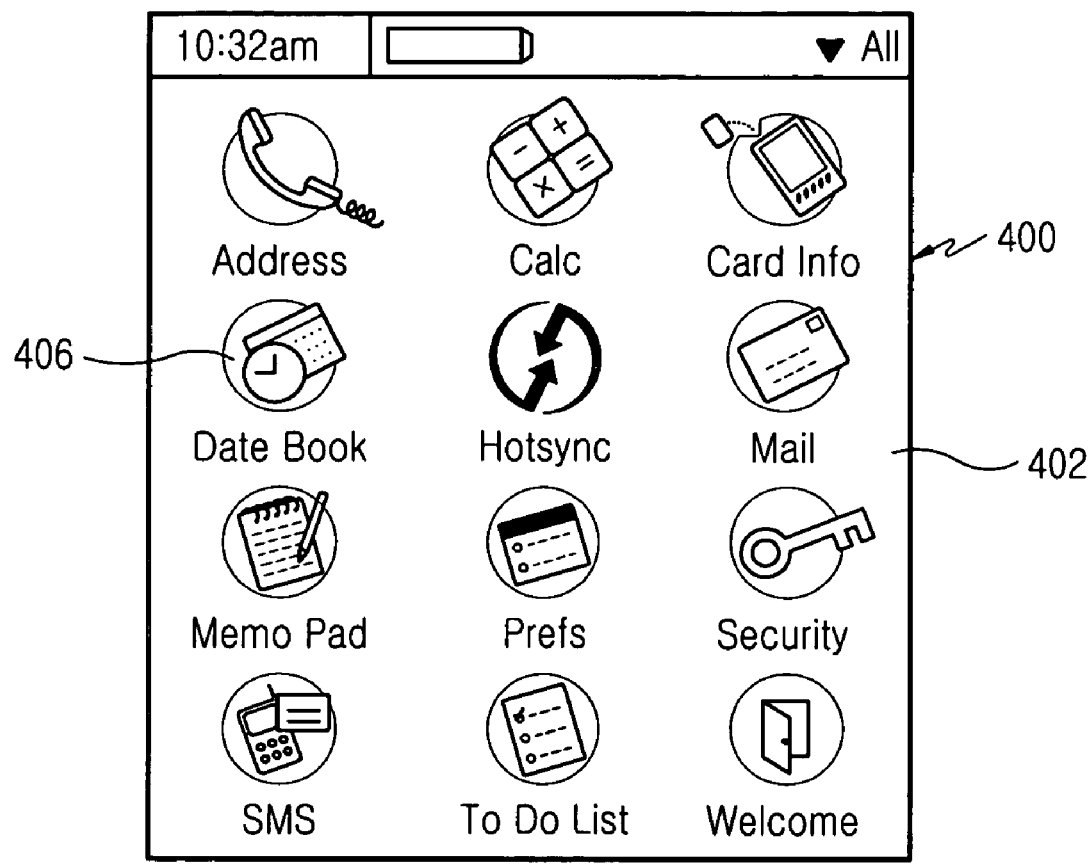

Referring to FIGS. 4A and 4B showing examples for providing virtual graffiti, some parts of the screen 402 contained in the touch-screen display 400 are assigned to a virtual graffiti area 404 in such a way that it may provide a virtual graffiti function. If the virtual graffiti function of the present invention is enabled, a graffiti screen image and a main screen image are overlapped with each other in the virtual graffiti area 404 as shown in FIG. 4A. Otherwise, if the virtual graffiti function is disabled, only a main screen image is displayed, as shown in FIG. 4B. Similar to images displayed on screens 104, 204, and 302 of FIGS. 1, 2, 3A and 3B, respectively, the main screen image of FIG. 4B indicates an image generated by the execution of an OS (Operating System) or various applications. Similar to the graffiti area 304 of FIG. 3A, the graffiti screen image of FIG. 4A indicates an image displayed to provide a user with a virtual graffiti function. The virtual graffiti area 404 of FIG. 4A is partially overlapped with the screen 402, whereas the graffiti area of FIG. 3A is used as a dedicated area for virtual graffiti. Therefore, as shown in FIG. 4A, some icons 412 contained in the plurality of icons needed for the execution of various applications are overlapped with a graffiti screen image whereas the other icons 406 are displayed on the screen 402 without any change. In more detail, in the same way as in FIG. 3A, the virtual graffiti area 404 includes a plurality of icons 410 needed for the graffiti function and a graffiti input box 408 for receiving graffiti generated by the user touching box 408 using a stylus pen. The graffiti input box 408 is overlapped with the main screen image so that it is translucently displayed on the main screen image.

Figure 5:
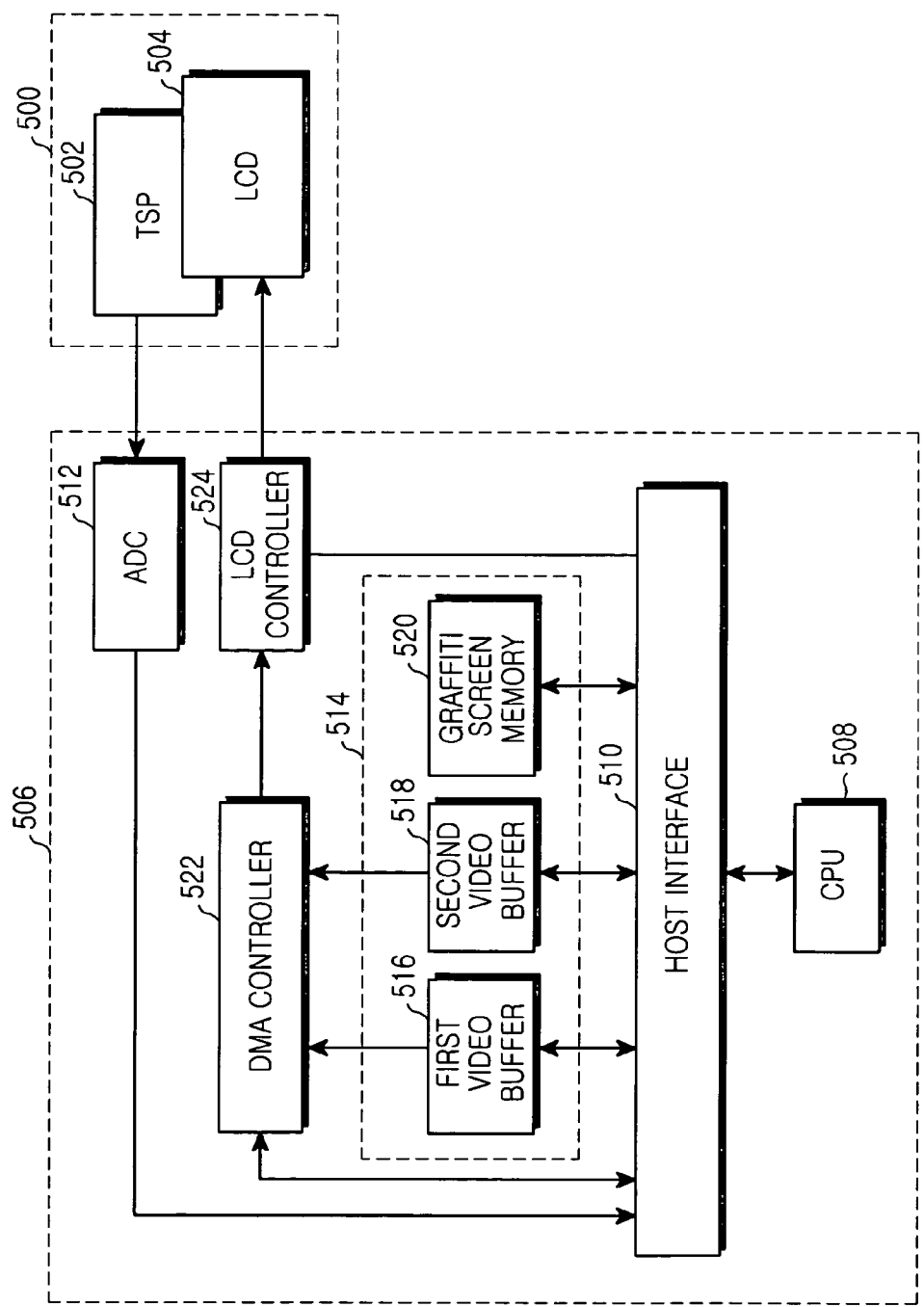
FIG. 5 is a block diagram illustrating an apparatus for providing virtual graffiti in accordance with a preferred embodiment of the present invention.

FIG. 5 is a block diagram illustrating an apparatus for providing the virtual graffiti function in accordance with a preferred embodiment of the present invention. Referring to FIG. 5, a touch-screen display 500 corresponds to the touch-screen displays 400 of FIGS. 4A and 4B, and includes an LCD (Liquid Crystal Display) 504 for displaying images thereon and a TSP (Touch-Sensitive Panel) 502 for receiving user-entry data from a user. The touch-screen display 500 generally is constructed such that the LCD 504 is covered with the TSP 502, so as to display information on the screen 402 of FIGS. 4A and 4B and at the same time can receive user-entry data as a result of the user touching the screen 402.

A controller 506 connected to the touch-screen display 500 overlaps the graffiti screen image with the main screen image, and displays the overlapped image on the virtual graffiti area 404. The controller 506 classifies user-entry data created by the user touching the screen 402 into application execution entry data and graffiti entry data according to the user's touch position and/or the user's touch method, and processes the application execution entry data and the graffiti entry data differently from each other. The controller 506 includes an ADC (Analog-to-Digital Converter) 512, a memory 514, a DMA (Direct Memory Access) controller 522, an LCD (Liquid Crystal Display) controller 524, a CPU (Central Processing Unit) 508, and a host interface 510. The ADC 512, the memory 514, the DMA controller 522, and the LCD controller 524 are connected to the CPU (Central Processing Unit) 508 via the host interface 510.

The ADC 512 is connected to the TSP 502 of the touch-screen display 500, converts an analog user-entry signal created by the user touching the screen 402 into a digital signal, and transmits the digital signal to the CPU 508 via the host interface 510. The LCD controller 524, acting as a display controller, is connected to the LCD 504 of the touch-screen display 500 while simultaneously being connected to the DMA controller 522, drives the LCD 504 upon receiving video data from the DMA controller 522, and displays an image corresponding to the received video data on the screen 402.

The memory 514 includes first and second video buffers 516 and 518 and a graffiti screen memory 520, and stores video data by means of the CPU 508. The graffiti screen memory 520 stores video data of the graffiti screen image. The first video buffer 516 stores video data of the main screen image displayed on the screen 402. The second video buffer 518 stores the overlapped video data where the graffiti screen image is overlapped with the main screen image. The overlapped area occupies a portion of the main screen image, and corresponds to a virtual graffiti area 404 as shown in FIG. 4A. In this way, individual video data stored in the first and second video buffers 516 and 518 are selectively read by the DMA controller 522 upon receiving a control signal from the CPU 508, and the read data is transmitted to the LCD controller 524.

The CPU 508 processes user-entry data received from the ADC 512, selectively updates the video data of the first and second video buffers 516 and 518 according to the user-entry data, and controls a selective video data readout operation of the DMA controller 522 on the basis of specific information indicative of an enable or disable state of the virtual graffiti function upon receipt of a user's selection signal.

Figure 6:
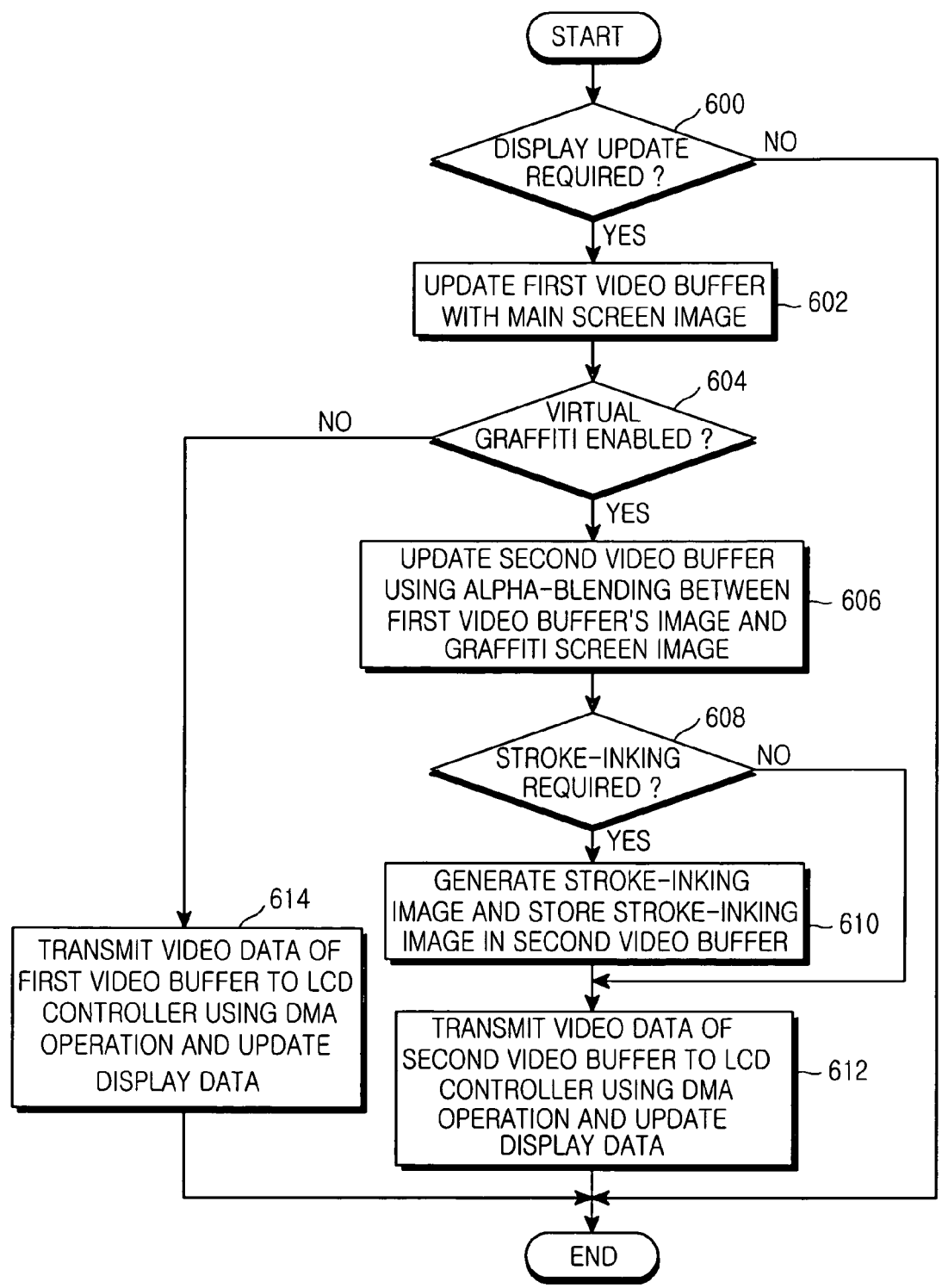
FIG. 6 is a flow chart illustrating a display update process in accordance with a preferred embodiment of the present invention.

A display update process for the CPU 508 for use in the apparatus of FIG. 5 is described in FIG. 6. A method for displaying images on the screen 402 to provide a user with a virtual graffiti function will hereinafter be described with reference to FIG. 7. The CPU 508 begins to perform operations of FIG. 6 according to a predetermined condition, and determines whether there is a need for the screen 402 to display an image thereon at step 600. There are a variety of startup conditions of the above CPU 508's operation, for example, a first condition where the user enters desired data on the screen 402 using a screen-touch method, a second condition where a current time reaches a periodic display update time determined by an OS (Operating System) timer, a third condition where display update operations are required due to the execution of various applications, etc.

Figure 7:
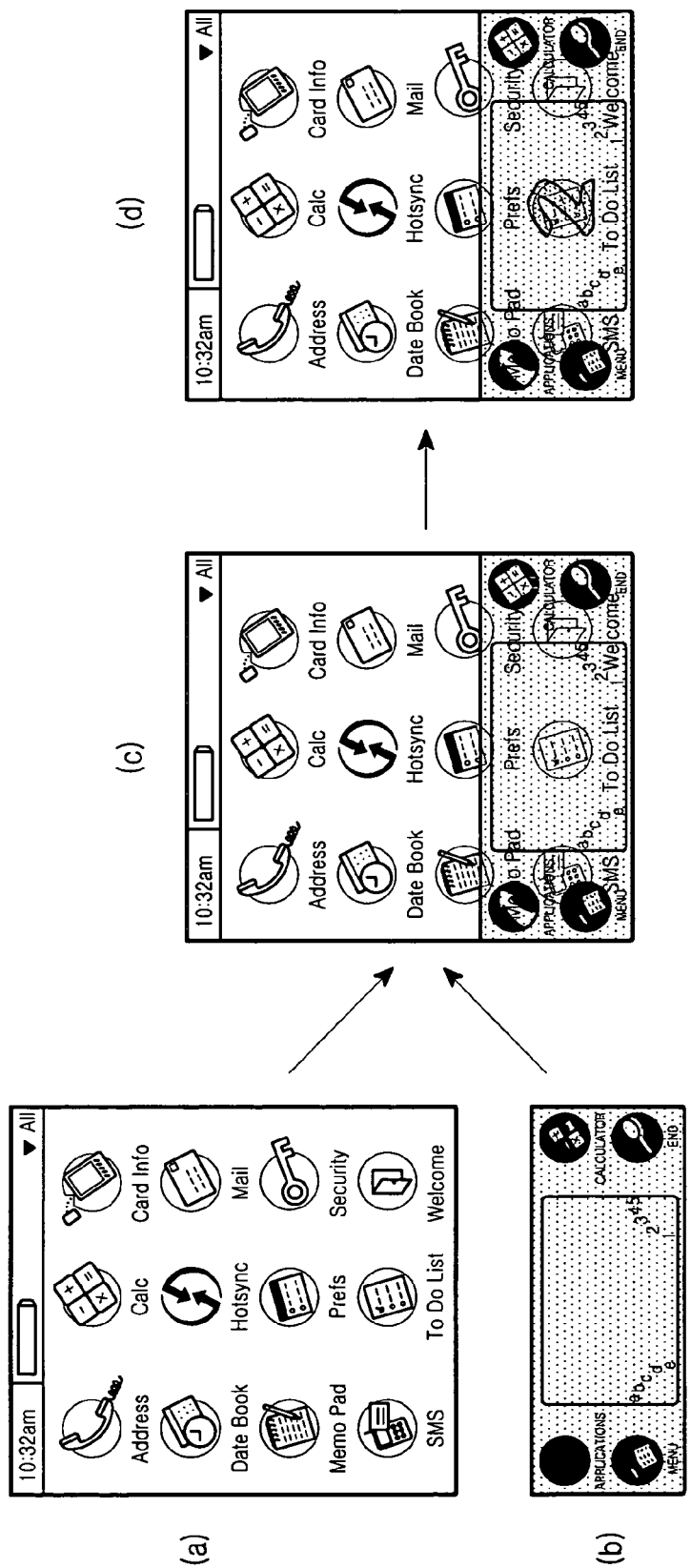
FIG. 7 is an example of the display update process in accordance with a preferred embodiment of the present invention.

If it is determined that such a display update operation is currently required at step 600, the CPU 508 updates data of the first video buffer 516 with a main screen image of FIG. 7(*a*) at step 602. Therefore, the first video buffer 516 stores video data of a specific image to be displayed on the screen 402 according to an OS or current active application. The CPU 508 determines if the virtual graffiti function is enabled or not at step 604. The enable or disable operation of the virtual graffiti function is selected by the user. If the user wishes to enter graffiti on the screen, the virtual graffiti function is enabled. Otherwise, if the user does not wish to enter graffiti on the screen, the virtual graffiti function is disabled. In this way, the user can freely select either one of two modes (i.e., the virtual graffiti enable mode and the virtual graffiti disable mode) in the same way as in FIGS. 3A and 3B.

If it is determined that the virtual graffiti function is enabled at step 604, the CPU 508 goes to step 606. Otherwise, if it is determined that the virtual graffiti function is disabled at step 604, the CPU 508 goes to step 614. The main screen image (e.g., FIG. 7(*a*)) stored in the first video buffer 516 is overlapped with a graffiti screen image (e.g., FIG. 7(*b*)) stored in the graffiti screen memory 520 using an alpha-blending method at step 606, such that the overlapped result is configured in the form of a specific image (e.g., FIG. 7(*c*)). The overlapped image is stored in the second video buffer 518 in such a way that the second video buffer 518 can be updated at step 606. In this case, the graffiti screen memory 520 is designed to pre-store the graffiti screen image of FIG. 7(*b*) in the form of a bitmap file or database. Therefore, the graffiti screen image can be replaced with a user-desired image, and the user can freely set up attribution (e.g., shape, size, and color, etc.) of the graffiti screen image. In order to provide the user with the graffiti screen image setup service, a user-setting window is provided on the screen in the same way as in a general image setup scheme, so that the user can freely change data displayed on the screen. Furthermore, the user can freely set up other attribution (e.g., position and transparency) of the virtual graffiti area 404 using the user-setting window. In this case, using an alpha-blending method, the main screen image is combined with the graffiti screen image at a predetermined overlap ratio varying with the setup transparency. For example, provided that the transparency of the graffiti screen image associated with the main screen image is set to 0.7 using a user-selection value or default value, a pixel value of the main screen image and the other pixel value of the graffiti screen image are blended with each other at a predetermined ratio of 7:3.

After the second video buffer 518 has been updated at step 606, the CPU 508 determines whether a stroke-inking operation is required at step 608. In the case where the user writes desired graffiti on the screen using screen-touch action to generate user's strokes, the stroke-inking operation is adapted to display the user's strokes on the virtual graffiti area 404 as shown in FIG. 7(*d*). In this case, the user can freely set up a variety of attribution (e.g., stroke-inking enable/disable state, color, transparency, etc.) using the user-setting window. Provided that the stroke-inking process is set up and the user writes desired data on the screen using screen-touch action, the CPU 508 generates a stroke-inking image caused by the user's stroke at step 610, stores the image in the second video buffer 518, and goes to step 612. Therefore, the stroke-inking image (e.g., FIG. 7(*d*)) is overlapped with the overlapped image (e.g., FIG. 7(*c*)) between the main screen image and the graffiti screen image. As shown in FIG. 7(*d*), a stroke-inking image of 2 is overlapped with the image of FIG. 7(*c*) when the user records a specific number 2 on the screen. Provided that the stroke-inking process is not set up and the user does not write desired data on the screen, the CPU 508 jumps from step 608 to step 612 without passing through step 610.

The DMA controller 522 transmits video data stored in the second video buffer 518 to the LCD controller 524 in such a way that a display update operation can be established at step 612. In this case, if the stroke-inking process of step 610 is not performed, the DMA controller 522 transmits the video data of FIG. 7(*c*) equal to the overlapped image between the main screen image and the graffiti screen image to the LCD controller 524, such that the video image of FIG. 7(*c*) is displayed on the screen 402. Otherwise, if the stroke-inking process of step 610 is performed, the DMA controller 522 transmits the video data of FIG. 7(*d*) where the stroke-inking image is overlapped with the overlapped image between the main screen image and the graffiti screen image to the LCD controller 524, such that the video image of FIG. 7(*d*) is displayed on the screen 402.

If it is determined that the virtual graffiti function is disabled at step 604, the DMA controller 522 transmits video data stored in the first video buffer 516 to the LCD controller 524 at step 614 so that a display update operation can be established. In other words, the DMA controller 522 transmits video data composed of only the main screen image of FIG. 7(*a*) to the LCD controller 524, such that a specific image having no virtual graffiti is displayed on the screen 402 as shown in FIG. 7(*a*).

The main screen image and the graffiti screen image are overlapped with each other in the virtual graffiti area 404. Accordingly, upon receiving user-entry data from the virtual graffiti area 404 contained in the screen 402, the CPU 508 must determine whether the received user-entry data is either entry data for application execution or graffiti entry data, and must process the received user-entry data according to the determined result. For this purpose, the CPU 508 classifies the user-entry data into application execution entry data and graffiti entry data according to a user's touch position and/or user's touch action, and differently processes the classified data. For example, if the user touches the screen 402 with a stylus pen and does not move the stylus pen contacted with the screen 402 during a predetermined time, the CPU 508 determines that the user-entry data is application execution entry data. In more detail, provided that a user's stylus pen touches the application icon 412 contained in the overlapped image between the main screen image and the graffiti screen image and remains at the touched position without any movement during a predetermined time, the CPU 508 executes an application program corresponding to the touched icon 412.

In a different manner from the example shown in FIG. 4A, the aforementioned method for executing the application program may also be adapted to another case where another application program different from the application program has already been executed, and may also be easily implemented using buttons currently displayed on the virtual graffiti area 404 of the screen 402 according to a current execution application program. On the other hand, provided that the user touches the screen 402 using the stylus pen, moves the stylus pen contacted with the screen 402 to another place of the screen 402, or takes the stylus pen off of the screen 402 before a predetermined time elapses, the CPU 508 determines that the user-entry data is graffiti entry data. In more detail, although the user's stylus pen touches the application icon 412 contained in the overlapped image between the main screen image and the graffiti screen image, if the user moves the stylus pen contacted with the screen 402 to another place on the screen 402, or takes the stylus pen off of the screen 402 before a predetermined time elapses, the CPU does not execute the application program corresponding to the icon 412 and determines that the user-entry data is graffiti entry data. In the case of recognizing the user-entry data as graffiti entry data, the graffiti entry data can be classified into two touch data units composed of first touch data created by the user touching the graffiti input box 408 and second touch data created by the user touching the graffiti icons 410. In more detail, if the user touches any place contained in the graffiti input box 408 using the stylus pen, and either moves the stylus pen contacted with the screen to another place or takes the stylus pen out of the screen before a predetermined time elapses, the CPU 508 determines that the user enters graffiti in the graffiti input box 408, resulting in the creation of the first touch data. If the user touches either the overlapped image between the application icon and the graffiti icon or only the graffiti icon using the stylus pen and takes the stylus pen off of the screen before a predetermined time elapses, the CPU 508 executes a program corresponding to the touched graffiti icon.

Figure 8:
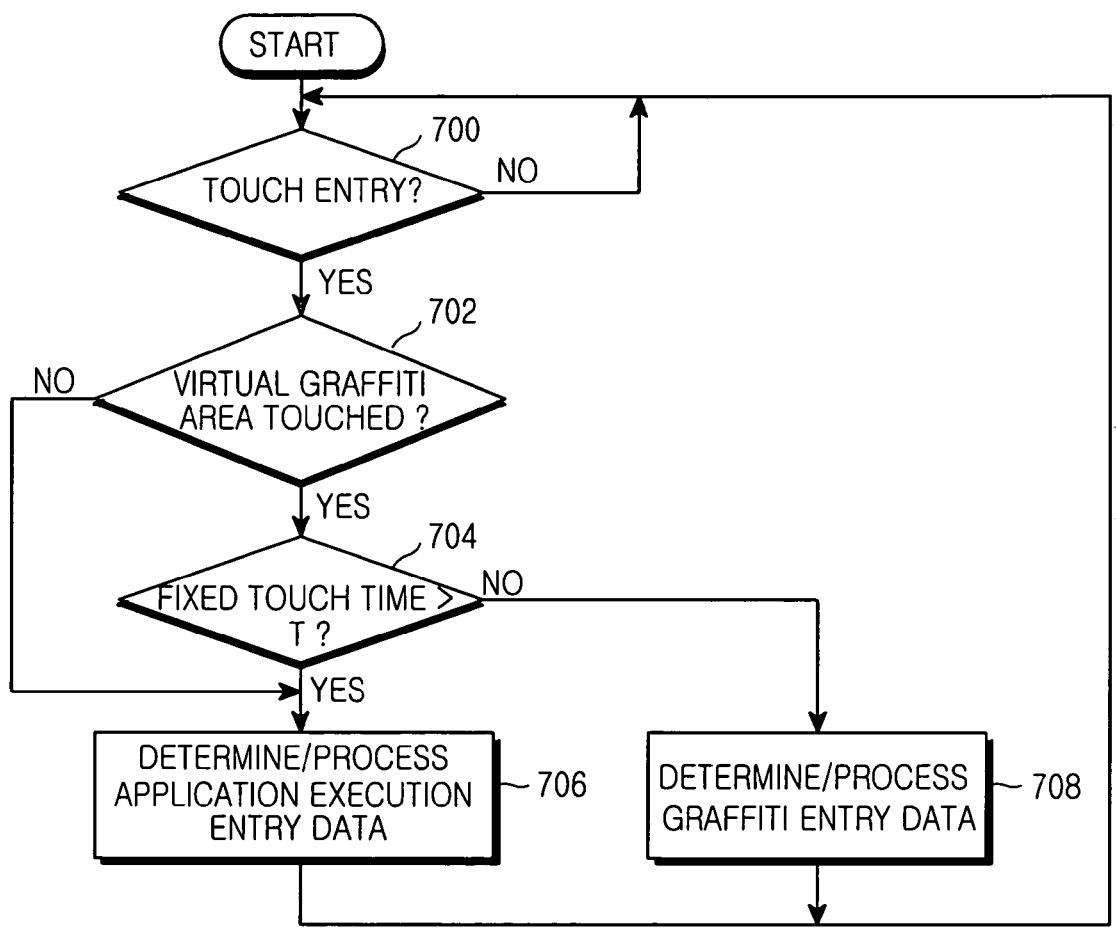
FIG. 8 is a flow chart illustrating a method for processing data created by the user touching a screen in accordance with a preferred embodiment of the present invention.

An exemplary method for controlling the CPU 508 to differently recognize the user-entry data resulting from the user touching the screen and process the differently-recognized data will hereinafter be described with reference to FIG. 8. Referring to FIG. 8, upon receiving user entry data resulting from the user touching the screen at step 700, the CPU 508 determines whether the touched position is contained in the virtual graffiti area 404 at step 702. If it is determined that the touched position is outside of the virtual graffiti area 404 at step 702, the corresponding touched position indicates a desire to execute an application program, so that the CPU 508 recognizes the user's touch data as entry data for application execution at step 706 and processes the application execution entry data. If the touched position is positioned in the virtual graffiti area 404 at step 702, the user's touch data may function as the application execution entry data or the graffiti entry data. Therefore, the CPU 508 determines if a duration time of the user touching a single point is longer than a predetermined time T at step 704. In this case, the user's touch duration time is called a fixed touch time, and indicates a predetermined time during which the user's stylus pen touches one point of the screen 402 and remains at the touched point without any movement. If the fixed touch time is longer than the predetermined time T at step 704, it is determined that the user-entry data generated by the user's touch is application execution entry data by the CPU 508 at step 706 and CPU 508 processes the recognized data. Otherwise, if the fixed touch time is shorter than a predetermined time T, it is determined that the user-entry data is equal to either the first touch data created by the user touching the graffiti input box 408 or the second touch data created by the user touching the graffiti icons 410, and the CPU 508 recognizes the user-entry data as graffiti entry data at step 708 and performs a corresponding process. In this case, if the touched position is in the graffiti input box 408, the CPU 508 recognizes the user-entry data as the first touch data indicative of graffiti entry data, and performs a corresponding process. Otherwise, if the touched position is outside of the graffiti input box 408, the CPU 508 performs an application program associated with a corresponding graffiti icon 410.

Therefore, a virtual graffiti area is set up in some parts of the screen of the touch-screen display, a graffiti screen image is overlapped with a main screen image in the virtual graffiti area, the overlapped image between the main screen image and the graffiti screen image is displayed on the virtual graffiti area, and user-entry data created by the user touching the screen is classified into application entry data and graffiti entry data according to the user's touch position and/or the user's touch method, such that the classified entry data units are processed differently. In this way, the virtual graffiti area can display application or virtual graffiti data, and can selectively execute either one of application data and virtual graffiti data while the user's touch for entering the application or virtual graffiti data remains in an active state, such that there is no need to require an additional area or space needed for providing a terminal with the virtual graffiti area. Therefore, a hand-held device limited in size can effectively implement a graffiti function, and can provide even a screen having a size ratio of 1:1 with virtual graffiti.

As is apparent from the above description, the method for providing virtual graffiti according to the present invention can be implemented with a computer-readable recording medium storing an execution program, and the computer-readable recording medium having the execution program is contained in an apparatus equipped with a CPU and a touch-screen display. In this case, the touch-screen display can receive user-entry data as a result of the user touching the screen, and at the same time can display information on the screen. In the case of performing a stroke-inking process, the present invention enables the controller to automatically determine color and transparency of user's stroke image on the basis of background color of the screen, such that the user's stroke image can be easily distinguished from the background color, resulting in an increased visual recognition degree of the user's stroke image.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for providing a virtual graffiti function, comprising:
 a touch-screen display for displaying information on its screen, and at the same time receiving user-entry data created by a user touching the touch-screen display; and
 a controller connected to the touch-screen display, which controls a transparent overlap of a graffiti screen image and a main screen image in a virtual graffiti area of the touch-screen display for providing a portion of the screen with virtual graffiti when the virtual graffiti function is enabled, classifies the user-entry data created by the user touching the touch-screen display into application execution entry data and graffiti entry data according to at least one of the touched position and a manner in which the user touches the screen, and processes the classified user-entry data according to the classification.

2. The apparatus as set forth in claim 1, wherein the controller enables or disables the virtual graffiti function upon user's selection.

3. The apparatus as set forth in claim 1, wherein the controller can change one or more pieces of attribution from among a variety of pieces of attribution composed of position, shape, transparency, size, and color data of the virtual graffiti input area to other data upon user's selection.

4. The apparatus as set forth in claim 1, wherein the controller overlaps user's stroke image resulting from the user touching the virtual graffiti input area with the virtual graffiti input area, and controls the overlapped image to be displayed.

5. The apparatus as set forth in claim 4, wherein the controller determines color and transparency of the user' stroke image on the basis of a background color of the touch-screen display such that the user's stroke image can be distinguished from the background color.

6. The apparatus as set forth in claim 1, wherein the controller includes:
 a display controller for displaying an image corresponding to entry video data on the touch-screen display;
 an ADC (Analog-to-Digital Converter) for converting an analog user-entry signal generated by the user touching the touch-screen display into a digital signal;
 a memory including a graffiti screen memory for storing video data of the graffiti screen image, a first video buffer for storing video data of the main screen image, and a second video buffer for storing video data of the overlapped image between the main screen image and the graffiti screen image;
 a DMA (Direct Memory Access) controller for selectively reading individual video data stored in the first and second video buffers, and transmitting the read video data to the display controller;
 a CPU (Central Processing Unit) for processing user-entry data received from the ADC, selectively updating video data stored in the first or second video buffer according to the user-entry data, and controlling the selective video data readout operation of the DMA controller according to enable or disable state information of the virtual graffiti function generated by the user-entry data; and
 a host interface for providing the display controller, the memory, and the DMA controller with an interface of the CPU.

7. The apparatus as set forth in claim 6, wherein:
 if the virtual graffiti function is enabled, the CPU updates the first video buffer, updates the second video buffer by overlapping the graffiti screen image stored in the graffiti screen memory with the main screen image stored in the first video buffer, controls the DMA controller to read the video data of the second video buffer, and transmits the read video data to the display controller, and
 if the virtual graffiti function is disabled, the CPU updates the first video buffer, controls the DMA controller to read the video data of the first video buffer, and transmits the read video data to the display controller.

8. The apparatus as set forth in claim 7, wherein the CPU can change one or more attribution from among a variety of attribution composed of position, shape, transparency, size, and color data of the virtual graffiti input area upon receiving a selection signal from the user.

9. The apparatus as set forth in claim 7, wherein the CPU overlaps stroke-inking data indicative of a stroke image generated by the user's touch when the virtual graffiti function is enabled.

10. The apparatus as set forth in claim 9, wherein the CPU determines color and transparency of the stroke image on the basis of a background color of the screen such that the stroke image can be distinguished from the background color.

11. A method for providing a virtual graffiti function using a touch-screen display which displays information on its touch-screen display and at the same time receives user-entry data created by a user touching the touch-screen display, comprising the steps of:
 a) transparently overlapping, in accordance with a control of a controller connected to the touch screen display, a graffiti screen image and a main screen image in a virtual graffiti area of the touch screen display for providing a portion of the screen with virtual graffiti when the virtual graffiti function is enabled, and displaying the overlapped image; and
 b) classifying the user-entry data created by the user touching the touch-screen display into application execution entry data and graffiti entry data according to at least one of the touched position and a manner in which the user touches the virtual graffiti area, and processing the classified user-entry data according to the classification.

12. The method as set forth in claim 11, further comprising the step of:
 c) enabling or disabling the virtual graffiti function according to a user's selection.

13. The method as set forth in claim 12, wherein step (a) includes the steps of:
 a3) if the virtual graffiti function is enabled, updating display data of the touch-screen display upon receiving the overlapped image between the graffiti screen image and the main screen image; and
 a4) if the virtual graffiti function is disabled, updating display data of the touch-screen display upon receiving the main screen image.

14. The method as set forth in claim 13, wherein step (a) further includes the step of:
 a5) changing one or more attribution from among a variety of attribution composed of position, shape, transparency, size, and color data of the virtual graffiti input area to other data according to a user's selection.

15. The method as set forth in claim 13, wherein step (a3) includes the step of:
 a3-1) overlapping stroke-inking data indicative of a stroke image generated by the user's touch with the overlapped image between the graffiti screen image and the main screen image, and updating display data of the touch-screen display.

16. The method as set forth in claim 15, wherein step (a3) further includes the step of:
 a3-2) determining color and transparency of the stroke image on the basis of a background color of the touch-screen display such that the stroke image can be distinguished from the background color.

17. The method as set forth in claim 11, further comprising the step of:
 d) changing one or more piece of pieces of attribution from among a variety of attribution composed of position, shape, transparency, size, and color data of the virtual graffiti input area to other data according to a user's selection.

18. The method as set forth in claim 11, wherein step (a) includes the step of:
 a1) overlapping user's stroke image resulting from the user touching the virtual graffiti input area with the virtual graffiti input area, and displaying the overlapped image.

19. The method as set forth in claim 18, wherein step (a) further includes the step of:
 a2) determining color and transparency of the user's stroke image on the basis of a background color of the screen such that the user's stroke image can be distinguished from the background color.

20. A computer-readable recording medium for storing an execution program for use in an apparatus including a CPU (Central Processing Unit) and a touch-screen display which displays information on its screen and at the same time receives user-entry data created by a user touching the screen, comprising the steps of:
- a) transparently overlapping a graffiti screen image and a main screen image in a virtual graffiti area of the touch-screen display for providing a portion of the screen with virtual graffiti when a virtual graffiti function is enabled, and displaying the overlapped image; and
- b) classifying the user entry-data created by the user touching the touch-screen display into application execution entry data according to at least one of the touched position and a manner in which the user touches the virtual graffiti input area, and processing the classified user-entry data according to the classification.

21. The computer-readable recording medium as set forth in claim 20, wherein step (a) includes the steps of:
- a1) if the virtual graffiti function is enabled, updating display data of the screen upon receiving the overlapped image between the graffiti screen image and the main screen image; and
- a2) if the virtual graffiti function is disabled, updating display data of the touch-screen display upon receiving the main screen image.

22. The computer-readable recording medium as set forth in claim 21, further comprising the step of:
- c) changing one or more piece of attribution from among a variety of pieces of attribution composed of position, shape, transparency, size, and color data of the virtual graffiti input area to other data according to a user's selection.

23. The computer-readable recording medium as set forth in claim 21, wherein step (a1) includes the step of:
- a1-1) overlapping stroke-inking data indicative of a stroke image generated by the user's touch with the overlapped image between the graffiti screen image and the main screen image, and updating display data of the touch-screen display.

24. The computer-readable recording medium as set forth in claim 23, wherein step (a1) further includes the step of:
- a1-2) determining color and transparency of the stroke image on the basis of a background color of the screen such that the stroke image can be distinguished from the background color.

* * * * *